US009525225B1

(12) United States Patent
Lee et al.

(10) Patent No.: US 9,525,225 B1
(45) Date of Patent: Dec. 20, 2016

(54) CARD CONNECTOR

(71) Applicant: Proconn Technology Co., Ltd., New Taipei (TW)

(72) Inventors: Yun Chien Lee, New Taipei (TW); Te Hung Yin, New Taipei (TW)

(73) Assignee: Proconn Technology Co., Ltd., New Taipei (TW)

( * ) Notice: Subject to any disclaimer, the term of this patent is extended or adjusted under 35 U.S.C. 154(b) by 0 days.

(21) Appl. No.: 14/953,046

(22) Filed: Nov. 27, 2015

(51) Int. Cl.
*H01R 13/635* (2006.01)
*H01R 12/72* (2011.01)

(52) U.S. Cl.
CPC .................................. *H01R 12/721* (2013.01)

(58) Field of Classification Search
CPC .. G06K 13/0831; G06K 13/08; G06K 13/085; G06K 7/0021; G06K 13/0812; G06K 13/0806; G06K 13/0825; G06K 13/0856; G06K 7/0056; G06K 13/06; G06K 7/0069; G06K 13/0862; H04B 1/3816; H01R 13/245; H01R 13/629; H01R 13/7132; H01R 4/4827; H01R 43/22; H01R 13/633; H01R 13/6335; H01R 13/62
See application file for complete search history.

(56) References Cited

U.S. PATENT DOCUMENTS

| 7,503,782 | B2* | 3/2009 | Chang | G06K 7/0069 439/159 |
| 8,814,582 | B2* | 8/2014 | Lee | G06K 13/0812 439/159 |
| 2015/0099383 | A1* | 4/2015 | Takasaki | H05K 7/1409 439/159 |
| 2016/0028172 | A1* | 1/2016 | Motohashi | H01R 12/716 439/160 |
| 2016/0036143 | A1* | 2/2016 | Motohashi | H01R 13/635 439/160 |
| 2016/0111802 | A1* | 4/2016 | Shimotsu | H01R 12/7076 439/159 |

* cited by examiner

*Primary Examiner* — James Harvey
*Assistant Examiner* — Matthew T Dzierzynski
(74) *Attorney, Agent, or Firm* — Lin & Associates Intellectual Property, Inc.

(57) ABSTRACT

A card connector includes an insulating housing, electrical terminals and a group of switch terminals which includes a detecting terminal and a grounding terminal fixed to the insulating housing. The detecting terminal has a horizontal first fixed portion and a resisting portion. The grounding terminal has a perpendicular second fixed portion, a flexing portion, a connecting portion and an extending plate. A rear edge of an outside of the extending plate is beyond the connecting portion. The ejector mechanism includes a sliding block with a pushing portion. The card first pushes the pushing portion rearward to press on an outside of the extending plate, then the card pushes the connecting portion and the pushing portion rearward simultaneously to ensure the extending plate always being pressed by the pushing portion, when the card is fully inserted in the card connector, the extending plate is against the resisting portion.

6 Claims, 4 Drawing Sheets

CARD CONNECTOR

BACKGROUND OF THE INVENTION

1. Field of the Invention

The present invention relates to a connector, and more particularly to a card connector.

2. The Related Art

Nowadays, card connectors are widely used in electronic products or electronic equipments. A traditional card connector for receiving an electrical card therein usually includes an insulating housing, a plurality of electrical terminals, a group of switch terminals and a shielding shell. The group of switch terminals includes a detecting terminal and a grounding terminal. The electrical terminals are molded in the insulating housing. The group of switch terminals is mounted on the insulating housing. And the shielding shell covers on the insulating housing.

However, when a card pushes the grounding terminal to contact with the detecting terminal, the grounding terminal is easy to tilt upward to make the contact between the grounding terminal and the detecting terminal unsteadily, therefore, it is difficult to judge if the card is completely inserted in the card connector.

SUMMARY OF THE INVENTION

Accordingly, an object of the present invention is to provide a card connector for electrically connecting a card and a circuit board. The card connector includes an insulating housing, a plurality of electrical terminals, a group of switch terminals and an ejector mechanism. The insulating housing has a bottom wall, a rear wall and a side wall, a rear of the bottom wall defines a receiving groove extending to the rear wall. The side wall defines a sliding slot. The electrical terminals are fixed in the insulating housing. The group of switch terminals includes a detecting terminal and a grounding terminal which are fixed to a rear of the insulating housing and electrically connected to the circuit board. The detecting terminal has a horizontal first fixed portion. A resisting portion is extended from the first fixed portion and close to the side wall and located in the receiving groove. The grounding terminal has a perpendicular second fixed portion. A flexing portion is extended from the second fixed portion. A connecting portion extends towards the side wall from a free end of the flexing portion. A bottom of the connecting portion connects an extending plate extending towards the side wall. A rear edge of an outside of the extending plate is beyond the connecting portion. The flexing portion, the connecting portion and the extending plate are located in the receiving groove. The ejector mechanism is mounted in the sliding slot of the side wall. The ejector mechanism includes a sliding block. An inside of a rear end of the sliding block has a pushing portion. The card first pushes the pushing portion rearward to press on an outside of the extending plate of the grounding terminal, then the card pushes the connecting portion and the pushing portion rearward simultaneously to ensure the extending plate always being pressed by the pushing portion when the grounding terminal is pushed rearward, when the card is fully inserted in the card connector, the extending plate is against the resisting portion.

As described above, when the card is inserted into the card connector, the card first pushes the pushing portion rearward to press on an outside of the extending plate of the grounding terminal, then the card pushes the connecting portion and the pushing portion rearward simultaneously to ensure the extending plate always being pressed by the pushing portion when the grounding terminal is pushed rearward. Therefore, the grounding terminal can move rearward steadily under push of the card.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
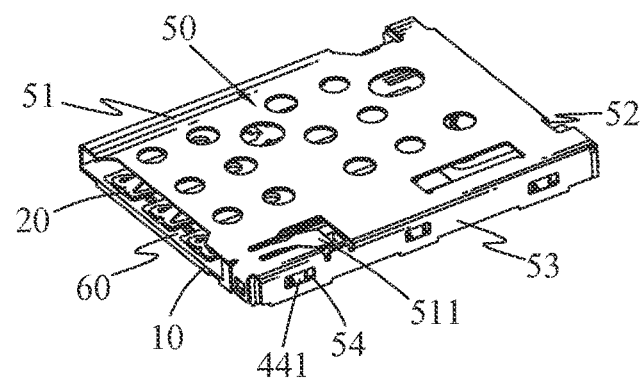
FIG. 1 is an assembled, perspective view of a card connector in accordance with an embodiment of the present invention.

Referring to the drawings in greater detail, and first to FIG. 1 to FIG. 4, an embodiment of the present invention is embodied in a card connector 100 for electrically connecting a card (not shown) and a circuit board (not shown). The card connector 100 includes an insulating housing 10, a plurality of electrical terminals 20, a group of switch terminals 30, an ejector mechanism (not labeled) and a shielding shell 50.

Figure 2:
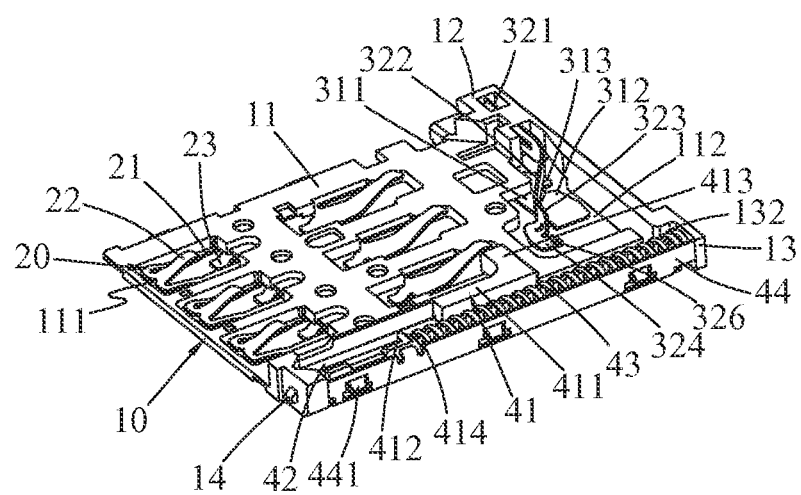
FIG. 2 is an assembled, perspective view of the card connector without a shielding shell shown in FIG. 1.
Figure 3:
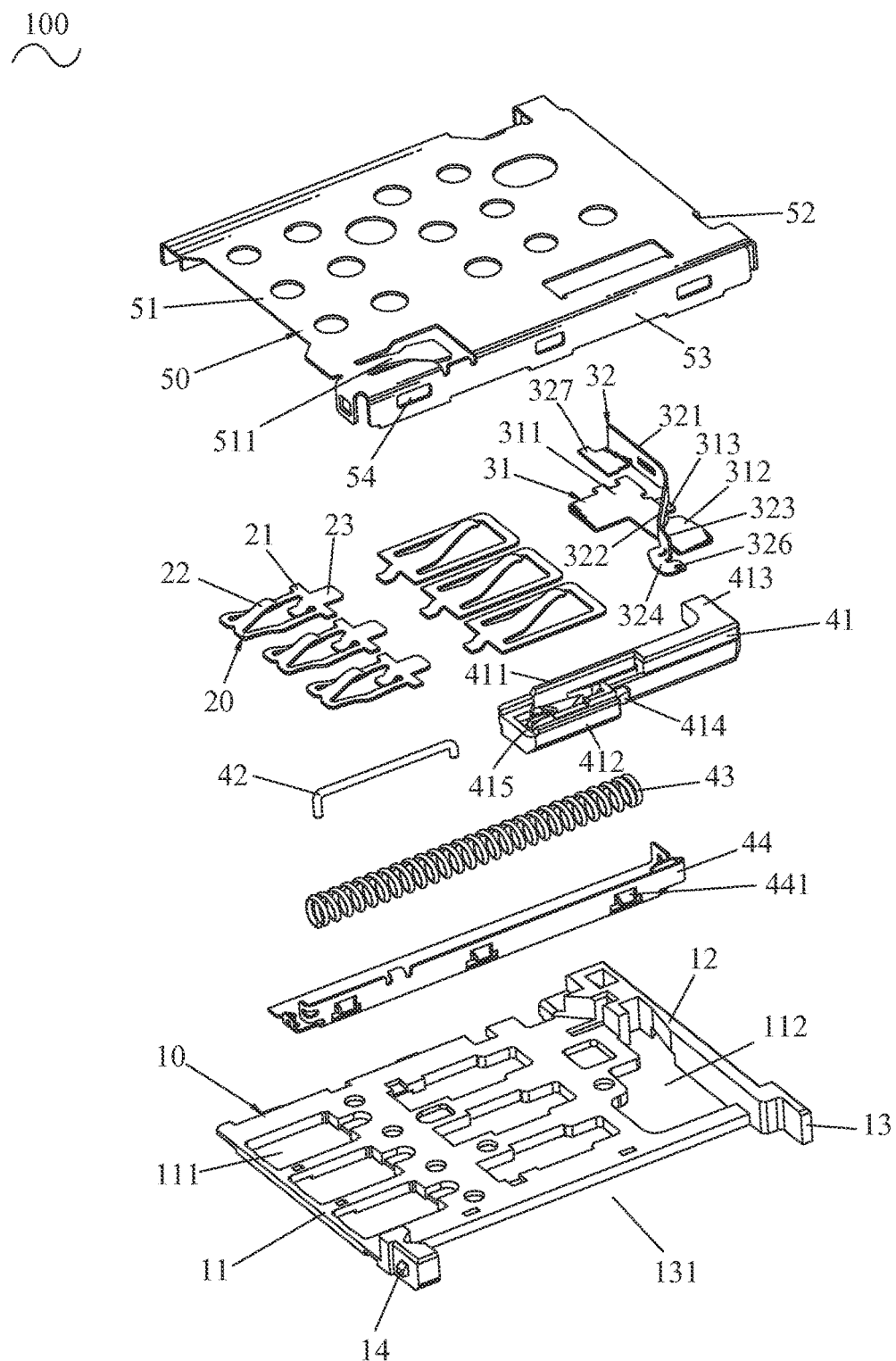
FIG. 3 is an exploded, perspective view of the card connector shown in FIG. 1.

Referring to FIG. 2 and FIG. 3, the insulating housing 10 has a bottom wall 11. A rear of the bottom wall 11 protrudes upward to form a rear wall 12. One side of the bottom wall 11 protrudes upward to form a side wall 13. A front of the bottom wall 11 of the insulating housing 10 opens a plurality of terminal grooves 111. A rear of the bottom wall 11 of the insulating housing 10 opens a receiving groove 112 extending to the rear wall 12. The side wall 13 of the insulating housing 10 opens a sliding slot 131. A periphery of the insulating housing 10 protrudes outward to form a plurality of buckling lumps 14.

Each of the electrical terminals 20 has a substantially rectangular annular holding portion 21. A contact portion 22 and a first soldering portion 23 are separately protruded upward and downward from the holding portion 21.

The electrical terminals 20 are molded in the bottom wall 11 of the insulating housing 10. In detail, the holding portion 21 of the electrical terminal 20 is fixed in a periphery of the terminal groove 111. The contact portion 22 of the electrical terminal 20 is received in the terminal groove 111 and protrudes upward beyond a top face of the bottom wall 11 of the insulating housing 10 for electrically connecting with the card. The first soldering portion 23 of the electrical terminal 20 protrudes downward beyond a bottom face of the bottom wall 11 of the insulating housing 10 for electrically connecting with the circuit board.

Figure 4:
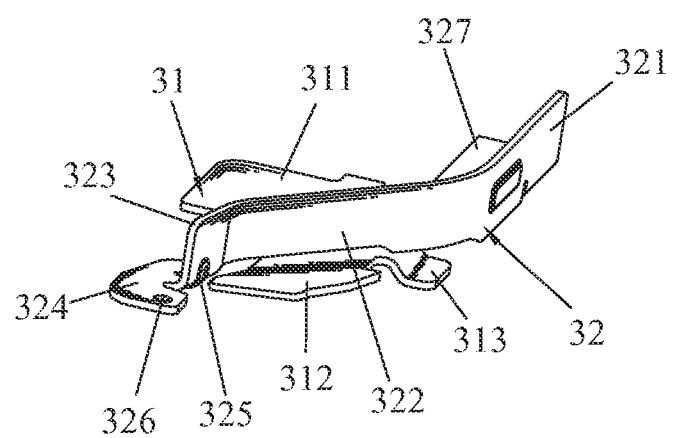
FIG. 4 is perspective view of a group of switch terminals of the card connector shown in FIG. 1.

Referring to FIGS. 2 to 4, the group of switch terminals 30 includes a detecting terminal 31 and a grounding terminal 32. The detecting terminal 31 has a horizontal first fixed portion 311 extending transversely. A resisting portion 312 extending from the first fixed portion 311 and further bent upward a little and close to the side wall 13 of the insulating housing 10. A second soldering portion 313 is extended from a rear of the first fixed portion 311. The grounding terminal 32 has a perpendicular second fixed portion 321 and extending transversely. A flexing portion 322 are extended towards the side wall 13 and further bent frontward from the second fixed portion 321. A connecting portion 323 extends towards the side wall 13 from a free end of the flexing portion 322. An extending plate 324 is extended frontward from the bottom of the connecting portion 323 and further extended towards the side wall 13 and then extended rearward to make the rear edge of the outside of the extending plate 324 beyond the connecting portion 323. A joint of a rear of the connecting portion 323 and a bottom of the extending plate 324 forms a rib 325 for being against the resisting portion 312 of the detecting terminal 31. A rear of the outside of the extending plate 324 protrudes upward to form a convex hull 326. A third soldering portion 327 is extended frontward from a bottom of the second fixed portion 321.

Referring to FIGS. 2-4, the group of switch terminals 30 are fixed to a rear of the insulating housing 10 and electrically connected to the circuit board. The first fixed portion 311 of the detecting terminal 31 is molded in the bottom wall 11 of the insulating housing 10, the resisting portion 312 of the detecting terminal 31 is located in the receiving groove 112 of the insulating housing 10, the second soldering portion 313 projects downward beyond the bottom face of the bottom wall 11 of the insulating housing 10 and electrically connects to the circuit board. The second fixed portion 321 of the grounding terminal 32 is molded in the rear wall 12 of the insulating housing 10, and the flexing portion 322, the connecting portion 323 and the extending plate 324 are located in the receiving groove 112 of the insulating housing 10. The connecting portion 323 and the extending plate 324 of the grounding terminal 32 are located in front of the resisting portion 312 of the detecting terminal 31 and not contact with the resisting portion 312. The resisting portion 312 is bent upward for strengthening a contact between the extending plate 324 of the grounding terminal 32 and the resisting portion 312 of the detecting terminal 31.

Referring to FIG. 2 and FIG. 3, the ejector mechanism is mounted in the sliding slot 131 of the side wall 13 of the insulating housing 10. The ejector mechanism includes a sliding block 41, a guiding rod 42, a spring 43 and a blocking sheet 44. The sliding block 41 has a main portion 411. An outside of a front end of the main portion 411 extends outward to form an attached portion 412 and an inside of a rear end of the main portion 411 of the sliding block 41 extends inward to form a pushing portion 413. A rear face of the attached portion 412 protrudes rearward to form a column 414. A top face of a front of the sliding block 41 is concaved downward to form a curve groove 415. The blocking sheet 44 is an L-shaped sheet and extends in longitudinal direction. The blocking sheet 44 is punched a plurality of barbs 441. Two opposite ends of the blocking sheet 44 are molded in slot walls of the sliding slot 131 of the insulating housing 10. In detail, the blocking sheet 44 together with the sliding slot 131 surround a sliding space 132 for receiving the sliding block 41, the guiding rob 42 and the spring 43 therein. The sliding block 41 is slidably placed in the sliding space 132. One end of the guiding rob 42 is mounted in the insulating housing 10 and the other end of the guiding rob 42 is slidably mounted in the curve groove 415. One end of the spring 43 is worn outside of the column 414 and the other end of the spring 43 resists against the inner slot wall of the sliding slot 131 of the insulating housing 10.

Referring to FIG. 1, the shielding shell 50 covers on the insulating housing 10. The shielding shell 50 and the insulating housing 10 together formed an inserting chamber 60 for receiving the card therein.

Referring to FIG. 2, the shielding shell 50 has a top plate 51, a rear plate 52 and two side plates 53. The shielding shell 50 corresponding to the buckling lumps 14 of the insulating housing 10 and the barbs 441 of the blocking sheet 44 is opened a plurality of buckling holes 54. The buckling lumps 14 of the insulating housing 10 and the barbs 441 of the blocking sheet 44 are buckled in the buckling holes 54. The top plate 51 of the shielding shell 50 corresponding to the guiding rod 42 of the ejector mechanism is punched downward to form a tongue piece 511. The tongue piece 511 presses on the guiding rod 42 to prevent the guiding rod 42 break away from the curve groove 415.

In use, the card first pushes the pushing portion 413 rearward to press on an outside of the extending plate 324 of the grounding terminal 32, then the card pushes the connecting portion 323 and the pushing portion 413 rearward simultaneously to ensure the extending plate 324 always being pressed by the pushing portion 413 when the grounding terminal 32 is pushed rearward, when the card is fully inserted in the card connector 100, the extending plate 324 is against the contact portion 22.

As described above, when the card is inserted into the card connector 100, the card first pushes the pushing portion 413 rearward to press on an outside of the extending plate 324 of the grounding terminal 32, then the card pushes the connecting portion 323 and the pushing portion 413 rearward simultaneously to ensure the extending plate 324 always being pressed by the pushing portion 413 when the grounding terminal 32 is pushed rearward. Therefore, the grounding terminal 32 can move rearward steadily under push of the card.

What is claimed is:

1. A card connector for electrically connecting a card and a circuit board, the card connector comprising:

an insulating housing has a bottom wall, a rear wall and a side wall, a rear of the bottom wall defining a receiving groove extending to the rear wall, the side wall defining a sliding slot;

a plurality of electrical terminals fixed in the insulating housing;

a group of switch terminals including a detecting terminal and a grounding terminal which are fixed to a rear of the insulating housing and electrically connected to the circuit board, respectively, the detecting terminal having a horizontal first fixed portion, a resisting portion extended from the first fixed portion and close to the side wall and located in the receiving groove, the grounding terminal having a perpendicular second fixed portion, a flexing portion extending from the second fixed portion, and a connecting portion extending towards the side wall from a free end of the flexing portion, a bottom of the connecting portion connecting an extending plate extending towards the side wall, a rear edge of an outside of the extending plate being beyond the connecting portion, the flexing portion, the connecting portion and the extending plate located in the receiving groove; and an ejector mechanism mounted in the sliding slot of the side wall, the ejector mechanism including a sliding block, an inside of a rear end of the sliding block having a pushing portion, wherein the card first pushes the pushing portion rearward to press on an outside of the extending plate of the grounding terminal, then the card pushes the connecting portion and the pushing portion rearward simultaneously to ensure the extending plate always being pressed by the pushing portion when the grounding terminal is pushed rearward, when the card is fully inserted in the card connector, the extending plate is against the contact portion.

2. The card connector as claimed in claim 1, wherein the extending plate is extended frontward from the bottom of the connecting portion of the grounding terminal and further extended towards the side wall and then extended rearward to make the rear edge of the outside of the extending plate beyond the connecting portion.

3. The card connector as claimed in claim 2, wherein a joint of a rear of the connecting portion and a bottom of the extending plate forms a rib for being against the resisting portion of the detecting terminal.

4. The card connector as claimed in claim 2, wherein the first fixed portion extends transversely and is molded in the bottom wall, a second soldering portion is extended from a rear of the first fixed portion, the second fixed portion extends transversely and is molded in the rear wall, the flexing portion is extended towards the side wall and further bent frontward from the second fixed portion, a third soldering portion is extended from the second fixed portion.

5. The card connector as claimed in claim 1, wherein a rear of the outside of the extending plate protrudes upward to form a convex hull.

6. The card connector as claimed in claim 1, wherein the resisting portion is extended from the first fixed portion and further bent upward a little for strengthening a contact between the extending plate and the resisting portion.

* * * * *